June 26, 1956   F. H. DE ROOVERE   2,751,665
METHOD OF MOUNTING AN ELECTRIC CONDENSER OR
OTHER ELECTRIC COMPONETS IN A METAL CASE
Filed March 13, 1952

Inventor
F. H. DE ROOVERE
By R P Morris
Attorney

United States Patent Office 2,751,665
Patented June 26, 1956

2,751,665

METHOD OF MOUNTING AN ELECTRIC CONDENSER OR OTHER ELECTRIC COMPONENTS IN A METAL CASE

Frans Hendrik De Roovere, Antwerp, Belgium, assignor to International Standard Electric Corporation, New York, N. Y., a corporation of Delaware Application March 13, 1952, Serial No. 276,416

Claims priority, application Netherlands April 16, 1951

2 Claims. (Cl. 29—155.5)

The invention relates to a method of mounting electrical components such as an impedance element, e. g. condenser, in a metal case. It is well known that in the electrical communication industry it is frequently required to enclose components in sealed cases in order to prevent ingress of moisture or egress of the impregnating compound. This is particularly the case for condensers, but it is not confined thereto.

The object of the invention is to achieve new means for inserting an electrical component in a metal case which is filled in with an impregnating compound and to reduce the number of parts to be used to a minimum, as well as to simplify the assembling operation.

A feature of the invention resides in a method of mounting an electrical component such as an impedance element, e. g. condenser, in a metal case in which at least one terminal of said electrical component is directly affixed on said case whereby after filling said case with a resinous compound or such like in the liquid state and after polymerizing said compound until it reaches a solid state, said terminal or terminals is or are firmly embedded in said compound together with said electrical component and thereafter insulated from the metal case by removing a metal annulus or similar closed strip around the terminal or terminals.

The above mentioned and other objects and features of the invention will become more apparent and the invention itself will be best understood by referring to the following description of an embodiment taken in conjunction with the accompanying drawing in which:

Fig. 3 shows a perspective view of the condenser assembly shown in Fig. 2, with means for mounting a complete assembly on a bracket or such like.

Figure 1:
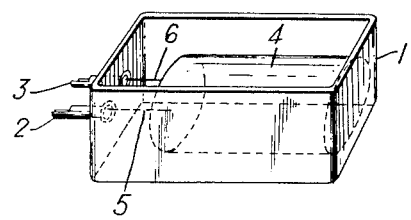
Fig. 1 shows a perspective view of the metal case in which the condenser is embedded.
Figure 2:
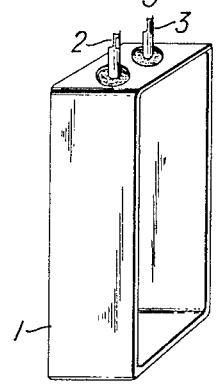
Fig. 2 shows a perspective view of the condenser assembly after all the operations have been completed.

Referring to Fig. 1, the metal case 1 which may, for example, be made in aluminium has an open face and may be obtained by punching or any other method.

Two terminal tags 2 and 3 are shown to be affixed directly on the metal case and provide the means for connecting the condenser 4 to an electrical circuit (not shown), by joining the connecting wires 5 and 6 respectively to the terminals 2 and 3. After the connecting wires have been soldered to the terminals 2 and 3, the metal case 1 will be used as a receptacle into which a suitable filling compound in the liquid or viscous state will be poured. This compound may be a non-polymerized synthetic resinous filling of the ethoxylic type. A sufficient quantity of the compound will be cast in the metal case 1 so as to cover the condenser 4 completely and preferably, the metal case 1 will be completely filled in up to the rims of its upturned vertical sides.

A thermal treatment will then follow, during which the resinous filling will be polymerized and will reach a solid state. It will then be appreciated that the condenser assembly is near its final state but that the terminal tags 2 and 3 are short-circuited to the metal case 1. A last operation will then be performed, i. e. the insulation of these terminal tags or at least one of these from the metal case. This will be obtained by cutting in any known manner a small metal annulus around the terminal tags or any suitable closed strip, after which the condenser will then be ready to be connected to an electrical circuit. The width of the closed strip of metal or annulus will, of course, depend on the minimum rupture voltage.

It will be noted that after the last cutting operation has been performed, the terminal tags are not loose since they project sufficiently inside the metal case 1 to be firmly embedded into the polymerized resinous compound.

Figure 3:
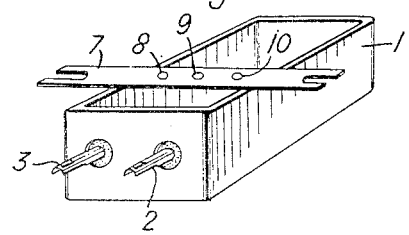

As shown in Fig. 3, there is no necessity to cover the open face of the metal case 1 since a smooth and rigid surface has been obtained with the solidified compound adhering closely to the vertical sides of the metal case 1, preventing any ingress of moisture. In this manner it is then possible to mount the condenser assembly on a bracket by means of the fixing strip 7 which can be directly anchored into the solidified filling compound at 8, 9 and 10.

Such condenser assemblies have been found to be extremely robust mechanically speaking to withstand appreciably high temperatures; the number of tools required for the various operations is very restricted whilst, furthermore, the metal case itself will be used as a mould during the polymerization process.

As compared to previously known methods the arrangement described above avoids the use of a lid, which generally also served as a terminal plate on which insulated tags were mounted, avoids the defects inherent to filling compounds such as bitumen and waxes which may become viscous when the temperature increases during use, and avoids the use of a separate mould when using polymerized synthetic resins necessitating long and complicated operations.

While the principles of the invention have been described above in connection with specific apparatus, it is to be clearly understood that this description is made only by way of example and not as a limitation on the scope of the invention.

I claim:

1. A method of mounting an electrical component within a metal case, the metal case being provided with at least one electrical terminal extending from inside the case to outside the case, the electrical component having at least one lead extending therefrom inside the case, the method comprising connecting firmly said lead to said terminal inside said case, filling said case with an insulating compound in the liquid state, solidifying said compound, whereby the lead and terminal are firmly embedded in said compound together with said electrical component, and removing the adjacent metal surrounding said lead and terminal, thereby insulating the lead and terminal from the case.

2. The method for mounting an electrical component according to claim 1, wherein said adjacent metal is in the form of an annulus surrounding said terminal.

References Cited in the file of this patent

UNITED STATES PATENTS

| 1,161,194 | Cook | Nov. 23, 1915 |
| 1,455,199 | Groten | May 15, 1923 |
| 1,924,435 | Homer | Aug. 29, 1933 |
| 2,181,695 | Given | Nov. 28, 1939 |
| 2,456,381 | Clark | Dec. 14, 1948 |
| 2,577,005 | Digiacomo | Dec. 4, 1951 |